United States Patent
Docy et al.

(10) Patent No.: US 6,840,089 B2
(45) Date of Patent: *Jan. 11, 2005

(54) FUEL TANK TESTER

(75) Inventors: Michael J. Docy, Cleveland, OH (US); George R. Hart, Brunswick, OH (US); Robert L. Bauman, Cleveland Heights, OH (US)

(73) Assignee: Hickok Incorporated, Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/774,765

(22) Filed: Jan. 30, 2001

(65) Prior Publication Data

US 2002/0100314 A1 Aug. 1, 2002

(51) Int. Cl.[7] .............................................. G01M 3/04
(52) U.S. Cl. ........................ 73/49.7; 702/51; 340/605
(58) Field of Search ................................. 73/49.7, 49.2, 73/40; 702/51; 340/605

(56) References Cited

U.S. PATENT DOCUMENTS

| | | | | |
|---|---|---|---|---|
| 3,852,996 A | * | 12/1974 | Klaubert et al. | ......... 73/40.5 R |
| 3,948,083 A | * | 4/1976 | Wickham | ...................... 73/39 |
| 4,272,985 A | * | 6/1981 | Rapson et al. | ............... 73/49.2 |
| 4,575,807 A | * | 3/1986 | Dodge | ........................ 340/605 |
| 4,876,530 A | * | 10/1989 | Hill et al. | .................. 340/605 |
| 5,412,978 A | * | 5/1995 | Boone et al. | .................. 73/40 |
| 5,425,266 A | * | 6/1995 | Fournier | ...................... 73/49.7 |
| 5,467,641 A | * | 11/1995 | Williams et al. | ............. 340/605 |
| 5,507,176 A | * | 4/1996 | Kammeraad et al. | ........ 73/49.2 |
| 5,509,296 A | * | 4/1996 | Kolb | ........................ 73/40.5 R |
| 5,753,800 A | * | 5/1998 | Gilliam | ....................... 73/40.7 |
| 5,883,301 A | * | 3/1999 | Filippi et al. | ................. 73/1.05 |
| 6,298,712 B1 | * | 10/2001 | Docy et al. | .................... 73/40 |
| 6,321,728 B1 | * | 11/2001 | Ohkuma | ..................... 123/520 |
| 6,327,898 B1 | * | 12/2001 | Harris | ......................... 73/49.2 |

FOREIGN PATENT DOCUMENTS

| | | | |
|---|---|---|---|
| JP | 11351078 A | * | 12/1999 |
| JP | 2001012318 A | * | 1/2001 |

* cited by examiner

*Primary Examiner*—Michael Cygan
(74) *Attorney, Agent, or Firm*—James A. Hudak (57) ABSTRACT

An apparatus and a method for testing the integrity of fuel tanks for leaks are disclosed. A microprocessor controls the pressurization of the fuel tank and then selectively allows the gas within the fuel tank to decay through any leaks within the tank or through the combination of the leaks within the tank and a reference orifice. By computing and comparing the time required for the tank pressure to decay between predetermined pressure levels due to any tank leaks with a standard decay time, a determination can be made whether the leakage rate through the tank is acceptable. Greater resolution, if necessary, is provided by computing the ratio of the time required for the tank pressure to decay between predetermined pressure levels through the combination of any tank leaks and a reference orifice versus only through the tank leaks and compares same against a standard ratio to determine whether the tank leakage rate is acceptable.

5 Claims, 5 Drawing Sheets

| Symbol | Parameter | Typ. | Unit |
|---|---|---|---|
| Taz | Time to Acquire Zero | 5 | Seconds |
| Tip | Time to Initial Pressurization | 60 | Seconds |
| Pi | Pressurization Initial | 14.5 | Inches H2O |
| Tas | Time for Adiabatic Stabilization | 60 | Seconds |
| Tdqpf | Time for Decay to Quick Pass / Fail | 30 | Seconds |
| Pf | Pressure Final | 14.5 | Inches H2O |
| Tct | Time to Complete Test | 155 | Seconds |

Fig. 4

| Symbol | Parameter | Typ. | Unit |
|---|---|---|---|
| Taz | Time to Acquire Zero | 5 | Seconds |
| Tip | Time to Initial Pressurization | 60 | Seconds |
| Pi | Pressurization Initial | 14.5 | Inches H2O |
| Tas | Time for Adiabatic Stabilization | 60 | Seconds |
| Tdqpf | Time for Decay to Quick Pass / Fail | 5 | Seconds |
| Pdqpf | Pressure Decay to Quick Pass / Fail | 0.75 | Inches H2O |
| Pf | Pressure Final | 14.5 | Inches H2O |
| Tct | Time to Complete Test | 130 | Seconds |

Fig. 5

FUEL TANK TESTER

TECHNICAL FIELD

The present invention relates, in general, to a testing device for a fuel tank and, more particularly, to a testing device which accurately and rapidly measures the rate of leakage of fuel vapors through the fuel tank and compares same against a leakage rate standard so that those tanks with leakage rates that exceed the standard can be readily identified.

BACKGROUND ART

The testing of the functional systems of vehicles has become quite sophisticated and requires extensive testing procedures to ensure that the vehicle components are operating properly and that the overall system performance is in accordance with specific guidelines. The Federal Environmental Protection Administration (EPA) has established extensive regulations limiting emissions from motor vehicles. One area of particular interest is the vehicle fuel system. The loss of fuel through evaporation to the atmosphere is wasteful and environmentally harmful since fuel vapors contribute to unwanted hydrocarbon pollution. In an effort to limit such pollution, the EPA has proposed that fuel tanks be pressure tested to determine whether the tanks have any leaks therein. Testing apparatus and procedures have been developed to determine the integrity of fuel tanks, however, such apparatus typically involve expensive flow rate measurement devices or utilize relatively low cost measurement devices that do not yield consistent results.

In view of the foregoing, it has become desirable to develop a more cost effective and efficient apparatus and method for testing the integrity of fuel tanks with respect to possible leakage of fuel vapors through same.

SUMMARY OF THE INVENTION

The present invention provides an apparatus and method for testing the integrity of fuel tanks. As such, the present invention includes a microprocessor that allows a pressure source, such as a compressed nitrogen supply, to pressurize the fuel tank to a first pressure level. Once pressure stabilization has been achieved within the fuel tank, the source of nitrogen and a reference orifice are closed allowing the pressure within the tank to decay, if a leak is present. If no leaks are present, the tank passes the test. If a large leak is present, the pressure within the tank decays rapidly and the tank fails the test. If, however, a relatively small leak exists, the tank is repressurized and a test is performed comparing the time required for the pressure within the tank to drop from a first pressure level to a second pressure level through both the leak and the reference orifice to the time required for such a pressure drop to occur through only the leak. By utilizing the ratio of the time required for the pressure within the system to drop from a first pressure level to a second pressure level with only the leak being present within the system and with the time required for same to occur with both the leak and the reference orifice being present within the system, a determination can be made whether the leak is of such a size that it can be accepted.

DESCRIPTION OF THE PREFERRED EMBODIMENT

Figure 1:
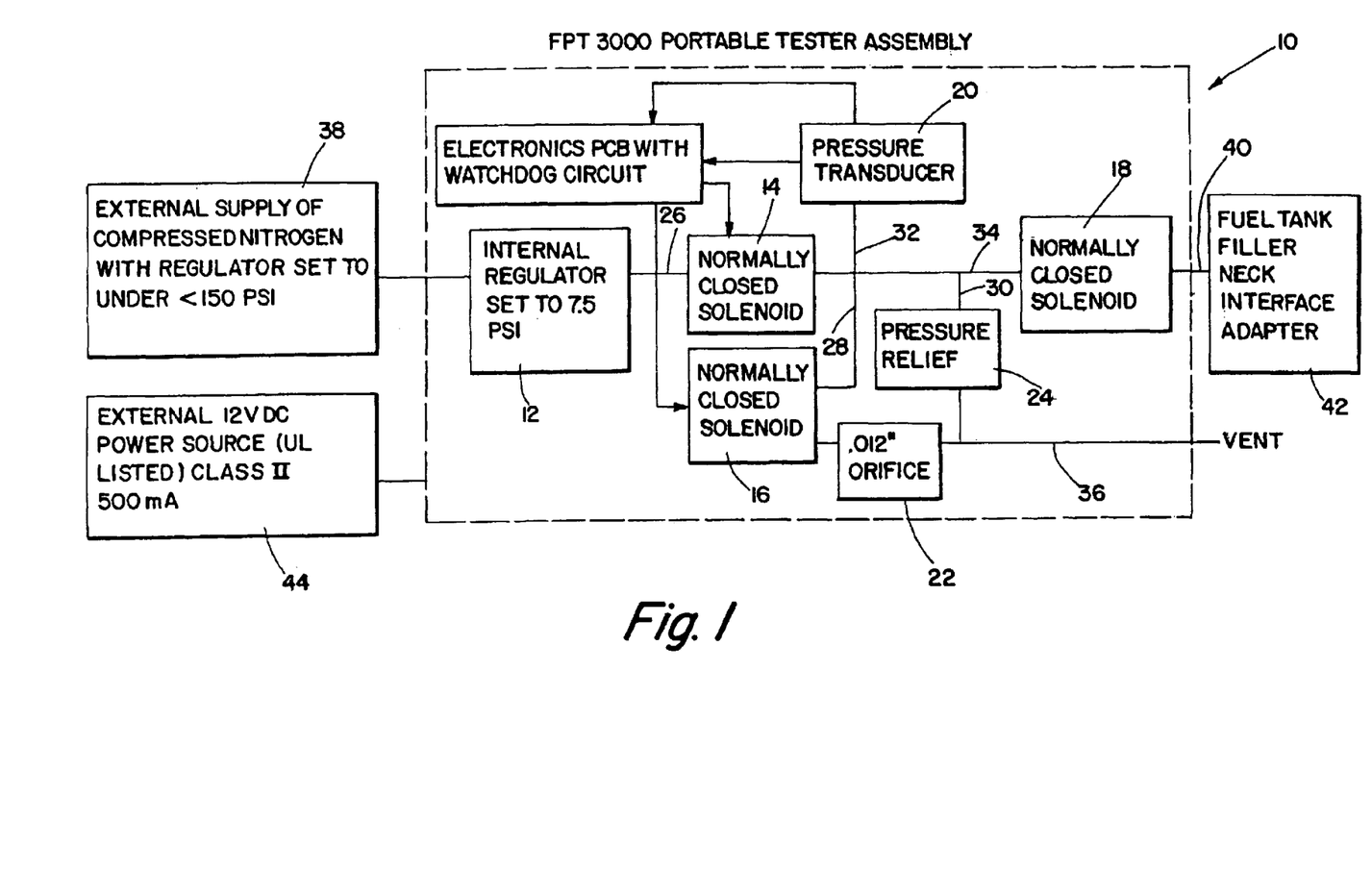
FIG. 1 is a schematic diagram illustrating the pneumatic circuit of the fuel tank tester of the present invention.

Referring now to the drawings where the illustrations are for the purposes of describing the preferred embodiment of the present invention and are not intended to limit the invention described herein, FIG. 1 is a schematic drawing illustrating the pneumatic circuit for the fuel tank tester 10 of the present invention. As such, the fuel tank tester 10 includes a pressure regulator 12, normally closed solenoid valves 14, 16 and 18, a pressure transducer 20, a reference orifice 22 and a pressure relief valve 24. The output of the pressure regulator 12 is connected to the input to normally closed solenoid valve 14 via tubing 26. The output of normally closed solenoid valve 14 is connected to the inputs to normally closed solenoid valve 16, pressure relief valve 24, pressure transducer 20 and normally closed solenoid valve 18 via tubings 28, 30, 32 and 34, respectively. An inline air filter (not shown) may be connected in tubing 28 between the output of normally closed solenoid valve 14 and the input to normally closed solenoid valve 16. The output of normally closed solenoid valve 16 is connected to the input to a reference orifice 22, which typically is a 0.012 inch diameter orifice restrictor. This orifice restrictor acts a standard orifice against which the fuel tank under test is compared. The output of the reference orifice 22 is connected via tubing 36 to a vent hole in the fuel tank tester housing. Similarly, the output of pressure relief valve 24 is connected to tubing 36 to permit the venting of same out of the fuel tank tester 10. An external supply of compressed nitrogen 38, set at about 25 psi, is connected to the input to pressure regulator 12. The output of normally closed solenoid valve 18 is connected to an air hose 40 which is provided with a quick disconnect fitting at its end thereof permitting its connection to a complementary quick disconnect fitting provided on an adapter 42 provided on the filler neck of the fuel tank to be tested. The fuel tank tester 10 is powered by an external 12 volt DC power source 44 attached to an appropriate input to same.

Figure 2:
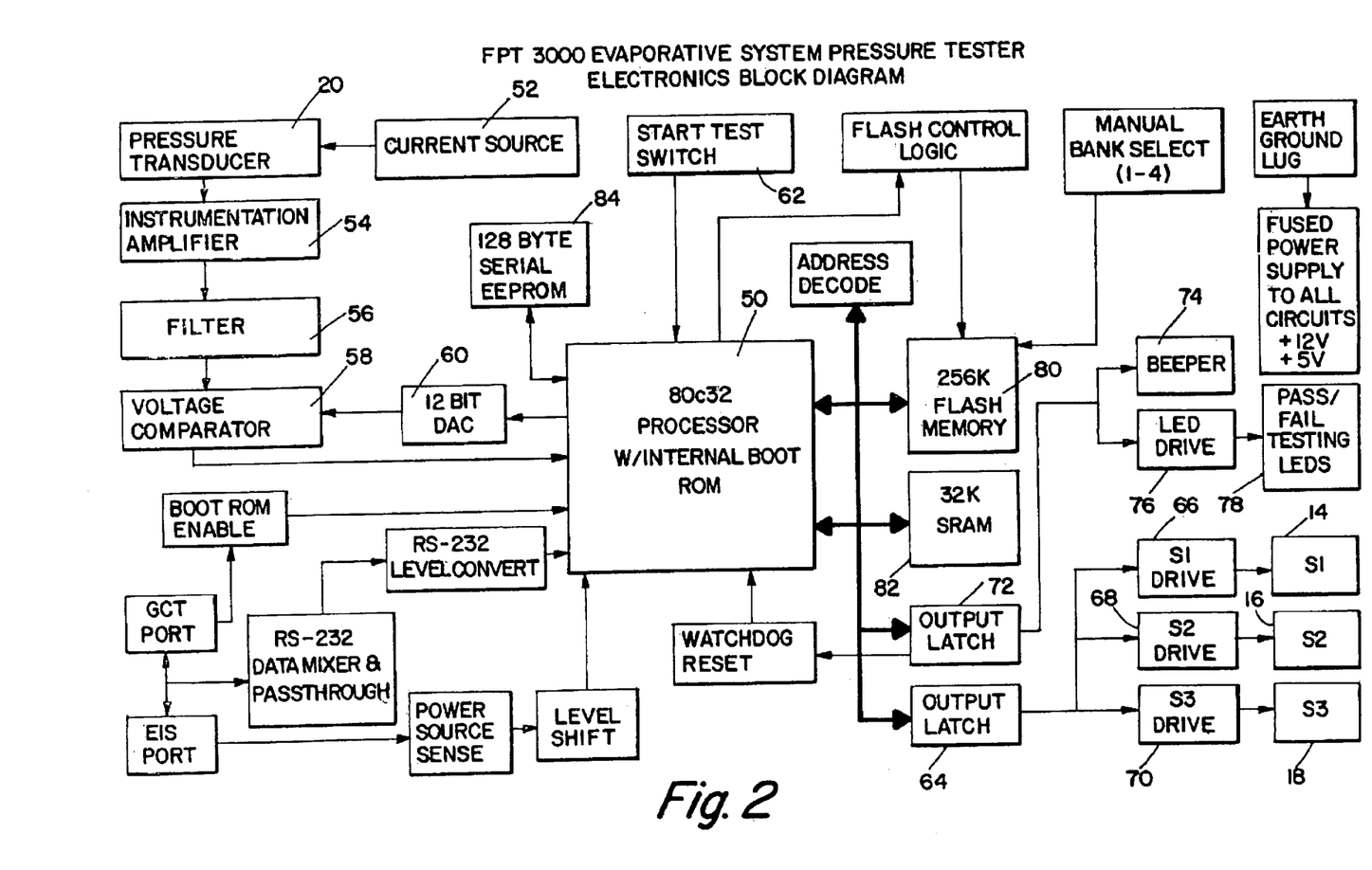
FIG. 2 is a schematic diagram illustrating the electrical circuit utilized by the fuel tank tester of the present invention.

The electrical circuit shown schematically in FIG. 2 controls the operation of the pneumatic circuit for the fuel tank tester 10 that is illustrated schematically in FIG. 1. Those components that have already been described with respect to FIG. 1 carry like reference numerals in FIG. 2. The circuit illustrated in FIG. 2 is controlled by a microprocessor 50 having a plurality of input circuits and output circuits associated therewith. With respect to the input circuits, one input circuit (shown schematically) includes a current source 52, pressure transducer 20, an instrumentation amplifier 54, a low pass filter 56, a voltage comparator 58 and a digital to analog converter 60. In this instance, the output of the current source 52 is connected to the input to the pressure transducer 20 whose output is connected to the input to the instrumentation amplifier 54. The output of the instrumentation amplifier 54 is connected to the input to the low pass filter 56 whose output is connected to the positive input to the voltage comparator 58. The analog output of digital to analog converter 60, whose input is connected to an output of the microprocessor 50, is connected to the negative input to voltage comparator 58. The output of voltage comparator 58 is connected to an input to microprocessor 50. A start test switch 62 is connected to another input to microprocessor 50. With respect to the output circuits associated with microprocessor 50, one output circuit includes a latch 64 whose output is connected to a plurality of drives 66, 68 and 70 which, in turn, actuate solenoid valve 14, 16 and 18, respectively. Another output circuit includes a latch 72 whose output is connected to a beeper 74 and to a light emitting drive circuit 76 whose output is connected to plurality of light emitting diodes in an LED display 78. In addition, a flash memory 80, a SRAM 82 and a serial EEPROM 84 are connected to outputs of the microprocessor 50.

During factory calibration, some values are permanently stored in EEPROM 84 associated with the microprocessor 50 and used during the fuel tank testing procedure. Such values include a zero pressure value, a full scale pressure value, a one gallon time value, a one gallon amount of "pumps" value, a 22.5 gallon time value, a 22.5 gallon amount of "pumps" value, a test ratio for 22.5 gallons, a test ratio for one gallon and a low inlet pressure set point. With respect to the zero pressure value, during factory calibration this value is adjusted and stored in EEPROM 84 and is required since the pressure transducer 20 is not zero compensated over temperature and thus, a zero pressure value is required before the system is operated and is added to the full scale pressure value to compensate for the foregoing. Regarding the full scale pressure value, during factory calibration a source of 14 inches of water pressure is applied to the hose 40 and the gain of the instrumentation amplifier 54 associated with pressure transducer 20 is adjusted to provide a 3,000 mv output. As for the one-gallon time value, during factory calibration a one-gallon tank and a 0.012 inch diameter orifice are connected to the fuel tank tester 10 through hose 40. The amount of time required for the pressure within the one-gallon tank to decay from 14 inches of water pressure to 13.75 inches of water pressure is measured. This time value is stored in EEPROM 84 and used during fuel tank testing to calculate the quick pass/fail threshold, hereinafter described. With respect to the one-gallon amount of "pumps" value, during factory calibration a one-gallon tank and a 0.012 inch diameter orifice are connected to the fuel tank tester 10 through hose 40. The number of "pumps" required to pressurize the one gallon tank to 14 inches of water pressure utilizing controlled pulses is measured and is stored in EEPROM 84 and used during fuel tank testing to calculate the quick pass/fail threshold. Regarding the 22.5 gallon time value, during factory calibration a 22.5 gallon tank and a 0.012 inch diameter orifice are connected to the fuel tank tester 10 through hose 40. The amount of time required for the pressure to decay within the 22.5 gallon tank from 14 inches of water pressure to 13.75 inches of water is measured. This time value is stored in EEPROM 84 and used during the fuel tank testing procedure to calculate the quick pass/fail threshold. As for the 22.5 gallon amount of "pumps" value, during factory calibration a 22.5 gallon tank and a 0.012 inch diameter orifice are connected to the fuel tank tester 10 through hose 40. The number of "pumps" required to pressurize the 22.5 gallon tank to 14 inches of water pressure utilizing controlled pulses is measured and stored in EPROM 84 and used during fuel tank testing to calculate the quick pass/fail threshold. With respect to the test ratio of 22.5 gallons, during factory calibration an external orifice having a 0.012 inch diameter and a tank having a volume of 22.5 gallons are connected to the hose 40 where the fuel tank under test would normally be connected. A calibration software algorithm, which is the same algorithm used during the fuel tank testing, is executed and the test result, the test ratio, is stored in EEPROM 84 and used for comparison purposes during the fuel tank testing procedure. Similarly, as for the test ratio for one gallon, during factory calibration an external orifice having a 0.012 inch diameter and a tank having a volume of one gallon are connected to the hose 40 where the fuel tank under test would normally be connected. A calibration software algorithm, which is the same algorithm used during the fuel tank testing, is executed and the test result, the test ratio, is stored in EEPROM 84 and used for comparison during the fuel tank testing procedure. Lastly, regarding the low input pressure set point value, the fuel tank tester 10 can measure the pressure of the external nitrogen supply 38 and compare this set point value to a factory calibrated value stored in EEPROM 84 to determine if adequate pressure is available to complete a fuel tank test.

Upon application of power to the fuel tank tester 10, the microprocessor 50 initializes all of its variables and its input/output ports. The microprocessor 50 then polls the port associated with the external power source 44 and enables serial communication if power is being applied to same. If power is not being applied to the fuel tank tester 10, serial communication is disabled. If power is being applied to the fuel tank tester 10, microprocessor 50 causes a self test to be performed consisting of checking its program memory, the random access memory within same and the pressure transducer 20. In order to start fuel tank testing, the start test switch 62 is actuated causing microprocessor 50 to access the zero pressure value of the pressure transducer 20 in EEPROM 84 to compensate for temperature drift of the pressure transducer 20. This is accomplished by closing solenoid valve 18, opening solenoid valve 16 and ramping the output of the digital to analog converter 60 from zero while the microprocessor 50 polls the output of the voltage comparator 58. When the voltage comparator 58 changes operating state, the value of the digital to analog converter 60 represents the offset pressure value for the pressure transducer 20. The zero pressure value stored during factory calibration is subtracted from the offset pressure value for the pressure transducer 20 and the difference is added to the full scale pressure value, which was also stored during factory calibration. The resulting pressure value (full scale plus the difference) is stored in a RAM location for use during the remainder of the test as the compensated full scale pressure value for the pressure transducer 20.

The external nitrogen supply 38 is then tested for adequate pressure to complete a fuel tank test. In this case, the solenoid valve 18 remains closed forming a closed pneumatic system. Solenoid valve 16, which is connected to reference orifice 22, is opened for a period of one second and then closed to allow the internal pressure within the fuel tank tester 10 to vent. The microprocessor 50 sets the output of the digital to analog converter 60 to the voltage corresponding to 14 inches of water pressure using the compensated full scale pressure value for the pressure transducer 20 previously stored. Solenoid valve 14, which controls the flow of nitrogen into the fuel tank tester 10, is then opened and a timer is initiated. When the voltage comparator 58 changes operating state, the timer is stopped. The value on the timer is then compared to the value that was previously stored for same in EEPROM 84 during factory calibration. If the value on the timer exceeds the aforementioned value, adequate pressure is not available to complete the fuel tank test. In this case, the microprocessor 50 aborts the remainder of the fuel tank test and causes a red LED in the LED display 78 to be illuminated indicating that the test has been aborted. If the value on the timer is less than or equal to the factory calibrated value, the fuel tank tester continues to the "pump-up" phase.

Figure 3:
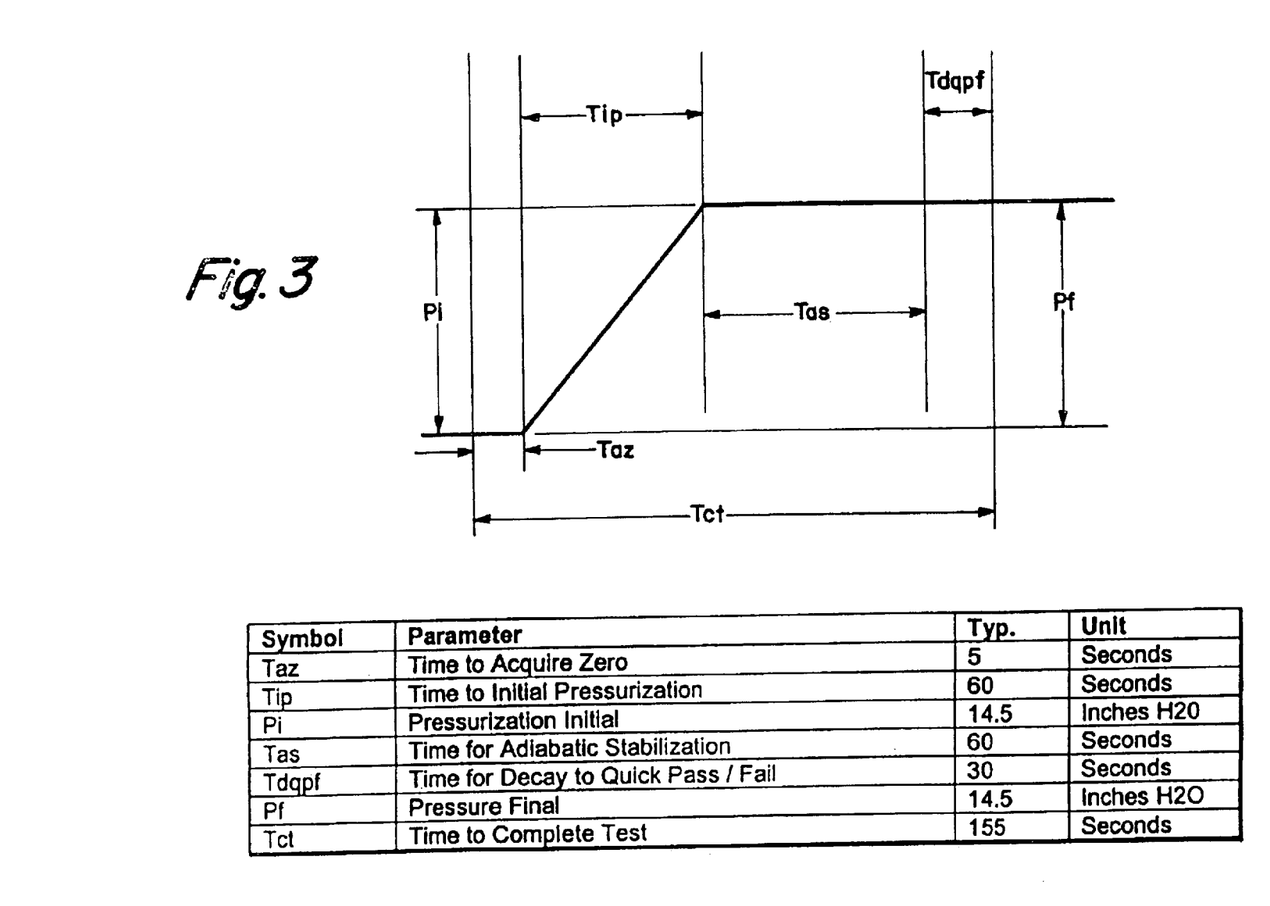
FIG. 3 is a graph of pressure versus time of a test for a fuel tank having no leaks therein.

Referring now to FIG. 3, the "pump-up" phase includes a routine that readies the fuel tank for testing by pressurizing the tank with nitrogen to 14 inches of water pressure and then quickly detecting whether any large leaks exist in the tank. In order to accomplish the foregoing, solenoid valve 16 is opened permitting the flow of nitrogen to the reference orifice 22 and solenoid valve 18 is also opened permitting the flow of nitrogen to the fuel tank under test via hose 40 and an appropriate adapter. A testing procedure is then executed which causes a series of pulses to be applied to solenoid valve 14 resulting in valve 14 being pulsed open for 200 ms and then closed for 200 ms for time interval Tip (Time for initial pressurization). The output value of the pressure transducer 20 is digitized by the digital to analog converter 60, the voltage comparator 58 and the microprocessor 50 using a successive approximation algorithm. The voltage comparator 58 compares the digitized output value of the pressure transducer 20 to the compensated full scale pressure value of 14 inches of water pressure. If the digitized output value does not equal the compensated full scale pressure value of 14 inches of water pressure, the solenoid valve 14 is again pulsed open for 200 ms and then closed for 200 ms. The voltage comparator 58 compares the resulting digitized output value of the pressure transducer 20 to the compensated full scale pressure value of 14 inches of water pressure. Upon each iteration of the foregoing pulsing routine, starting with the second iteration, the digitized value of the pressure transducer 20 is compared to the digitized output value of the immediately preceding iteration and if the succeeding digitized output value is not greater than the digitized output value of the immediately preceding iteration, the remainder of the fuel tank test is aborted. When this occurs, a red LED in the LED display 78 is illuminated indicating that a failed test has occurred. The failed test in this case is due to the inability of the fuel tank to be pressurized because of a large leak in the tank or a situation where the operator did not properly connect the hose 40 to the tank under test. With each iteration, a variable corresponding to the amount of "pumps" is incremented, thereby counting the number of 200 ms pulses necessary to pressurize the tank to 14 inches of water pressure. Because of different gasoline fill levels and various tank sizes, this variable is used later in the fuel tank test as an approximation of tank head space volume and fuel tank elasticity to improve the accuracy of the pass/fail result. When the "pump-up" phase has been successfully completed, the next phase in the testing procedure is the pressure stabilization phase.

Because of adiabatic heating resulting from pressurization and the change in gasoline vapor pressure over time, stabilization of the pressure within the fuel tank under test is required before actual leak testing can take place. The time required for the pressure within a tank to stabilize is largely dependent upon tank head space volume. The approximate tank head space volume measurement previously obtained is multiplied by two and used to establish the time period during which pressure stabilization within the tank must be achieved. Thus, a fuel tank having a relatively large head space volume requires a longer pressure stabilization time than a fuel tank having a smaller head space volume. During the pressure stabilization phase, solenoid valve 18, which controls the flow of nitrogen to the hose 40 connected to the fuel tank under test, and solenoid valve 16, which controls the flow of nitrogen to the reference orifice 22, are open. At the start of the pressure stabilization phase, a timer is actuated. If the digitized output value of the pressure transducer 20 is less than the compensated full scale pressure value plus 0.5 inches of water pressure, a series of pulses is applied to solenoid valve 14 resulting in valve 14 being pulsed open for 100 ms and then closed for 100 ms for time interval Tas (Time for adiabatic stabilization). In addition, if the digitized output value of pressure transducer 20 is found to be 5.0 inches of water pressure less than the compensated full scale pressure value, the remainder of the fuel tank test is aborted and a red LED in LED display 78 is illuminated indicating that a failed test has occurred. The failed test in this case is due to the inability of the fuel tank to be pressurized due to a large leak in the tank or to a situation where the operator disconnected the hose 40 to the tank under test. If the test has not been aborted, the tank is pressurized with nitrogen to 14.5 inches of water pressure, and the quick pass/fail phase of the test is initiated.

Figure 4:
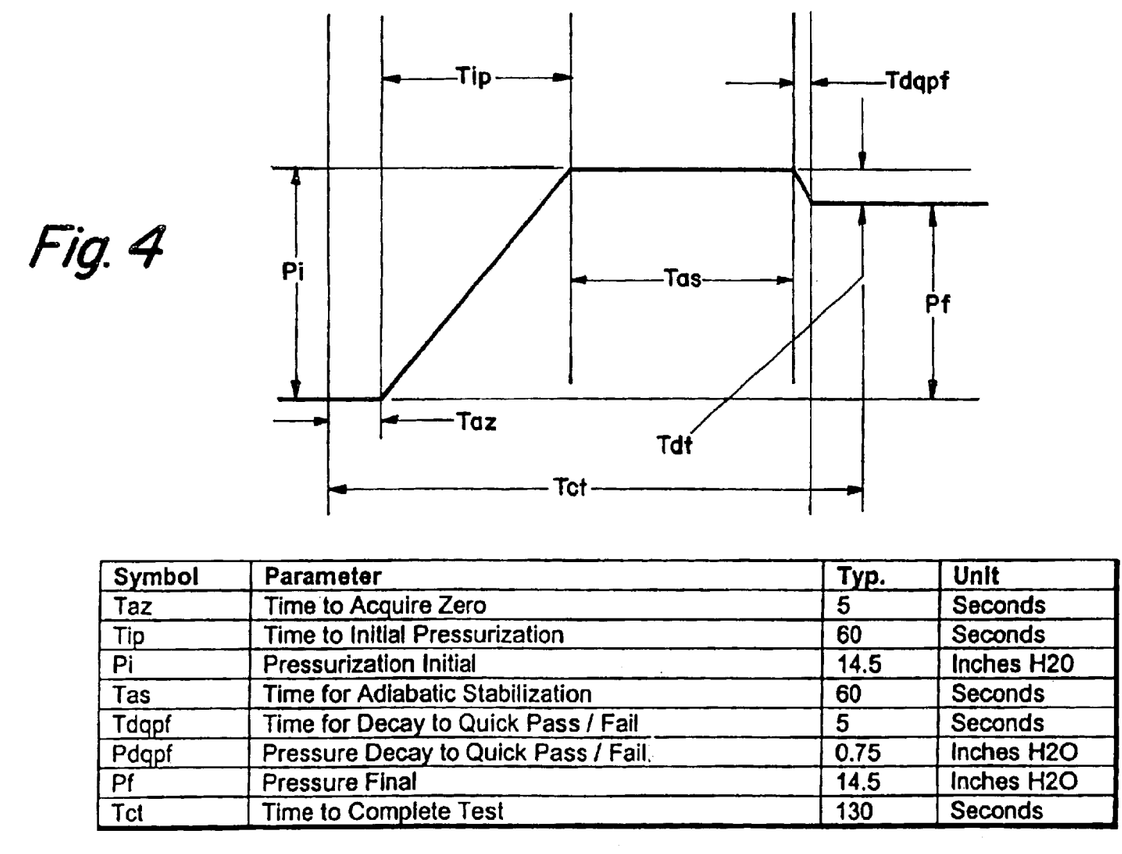
FIG. 4 is a graph of pressure versus time of a test for a fuel tank having a large leak therein.

The quick pass/fail phase of the test commences with a routine to calculate the time required for the pressure within the tank under test to decay from 14 inches of water pressure to 13.75 inches of water pressure when a leak having a diameter of 0.012 inches is present. This calculated time corresponds to the pass/fail threshold. Since the purpose of the quick pass/fail test is to rapidly determine whether the tank under test contains no leaks or a large leak, the aforementioned pass/fail threshold is increased by 50% to set the quick pass threshold and reduced by 50% to set the quick fail threshold. These values are obtained by using the values previously stored in EEPROM 84 for one gallon time, 22.5 gallon time, one gallon amount of "pumps" and 22.5 gallon amount of "pumps". The previously determined amount of "pumps" value is utilized as an approximate tank head space volume. When the quick pass/fail thresholds have been determined and stored in the RAM memory, the quick pass phase of the test, as shown in FIG. 4, can commence. The microprocessor 50 sets the output of the digital to analog converter 60 to a voltage corresponding to 14 inches of water pressure. In this phase of the test, solenoid valve 18, which controls the flow of nitrogen through hose 40 connected to the tank under test, is open and solenoid valve 14, which controls the flow of nitrogen into the tester 10, is closed. The microprocessor 50 polls the output of the voltage comparator 58. When the voltage comparator 58 changes operating state, i.e., pressure within the tank has stabilized at 14 inches of water pressure, the microprocessor 50 starts a timer and closes solenoid valve 16 closing the reference orifice 22, starting time interval Tdqpf (Time for decay for quick pass/fail). The microprocessor 50 then sets the output of the digital to analog converter 60 to a voltage corresponding to 13.75 inches of water pressure. The microprocessor 50 then polls the output of the voltage comparator 58 while comparing the value on the timer to the quick pass threshold time. If the value on the timer exceeds the quick/pass threshold time, such as in the case of a tank with no leak, the microprocessor 50 cause a green LED in LED display 78 to be illuminated indicating that the fuel tank has passed the test, and returns to the beginning of the program for a new test. If the voltage comparator 58 changes operating state, thus indicating that the pressure has decayed to 13.75 inches of water, the microprocessor 50 stops the timer. The value indicated on the timer is equal to the time required for the pressure within the tank under test to decay from 14 inches of water pressure to 13.75 inches of water pressure. This timer value is then compared to the previously stored quick fail threshold. If the value on the timer is less than the quick fail threshold, the microprocessor 50 causes a red LED in LED display 78 to be illuminated indicating that the tank has failed the leakage test and returns to the beginning of the program for a new test. If the timer value falls within the center of the aforementioned values, an additional test, referred to as the "ratio test", is required to determine the leakage rate with greater resolution.

Figure 5:
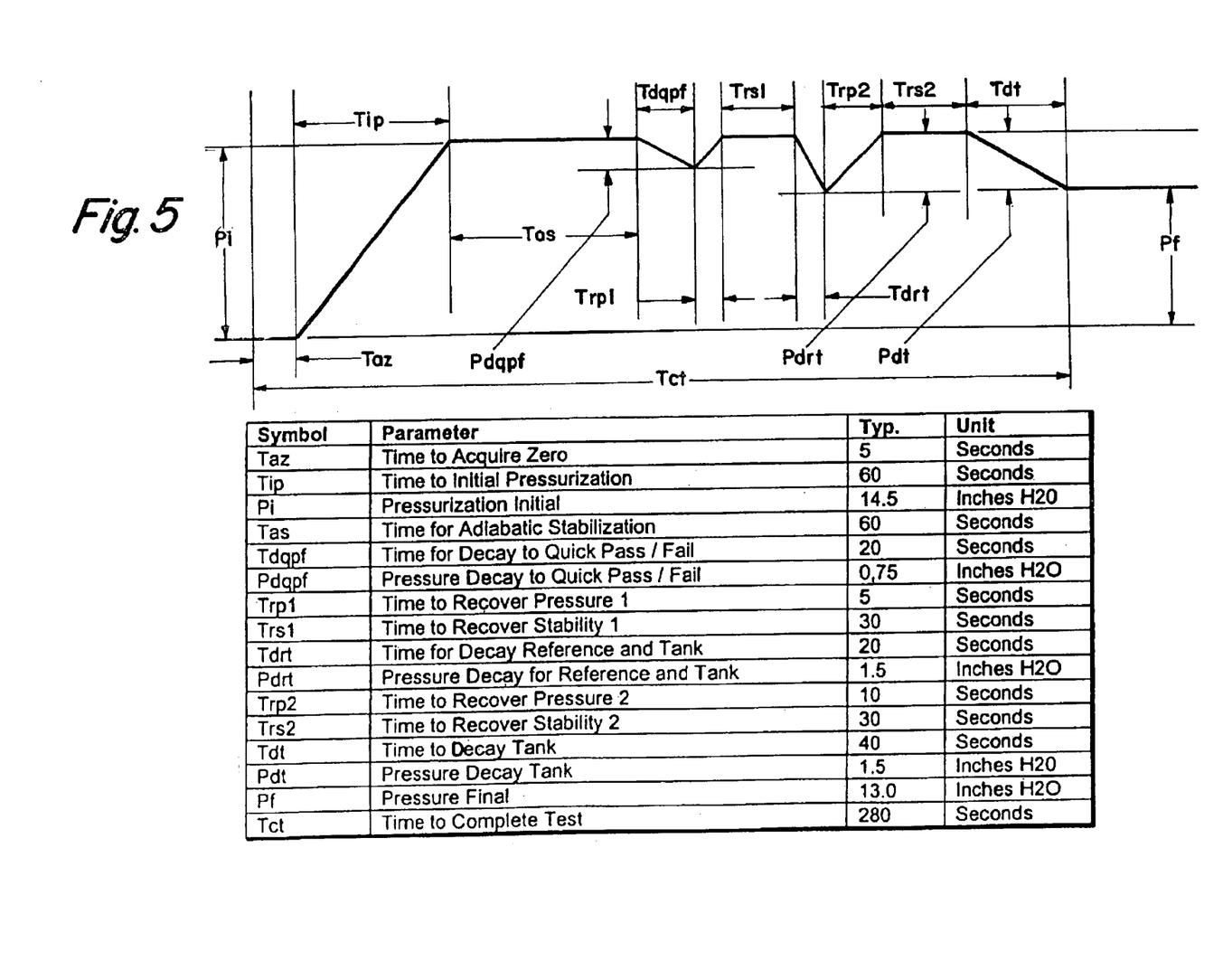
FIG. 5 is a graph of pressure versus time of a test for a fuel tank having a leak therein and which requires the determination of the ratio of the time for a predetermined pressure drop to occur therein through both the leak and a reference orifice versus the time for a similar pressure drop to occur therein through only the reference orifice.

The "ratio test" provides a means for measuring the leak rate of a tank under test when high resolution is necessary. This occurs when the result of the quick pass/fail test falls between the upper and lower thresholds. Thus, this test is only executed when the aforementioned condition exists. Referring now to FIG. 5, after the quick pass/fail test has been completed, the tank being tested is repressurized through a series of pulses being applied to solenoid valve 14 causing valve 14 to be pulsed open for 200 ms and then closed for 200 ms for time interval Trp1 (Time to recover pressure 1). The output value of the pressure transducer 20 is digitized using the digital to analog converter 60, voltage comparator 58 and microprocessor 50. If the digitized output value of the pressure transducer 20 does not equal the compensated full scale pressure value of 14.5 inches of water pressure within the tank, the aforementioned pulsing continues until the digitized output value reaches the full scale pressure value. Because of the adiabatic heating due to pressurization and changes in gasoline vapor pressure over time, the pressure within the tank is allowed to stabilize at 14.5 inches of water pressure by providing a series of pulses to solenoid valve 14 causing valve 14 to be pulsed open for 100 ms and then closed for 100 ms for time interval Trs1 (Time to recover stability 1). After pressure stabilization has been achieved, solenoid valve 16 is opened permitting gas to flow therethrough to the reference orifice 22. The microprocessor 50 sets the output of the digital to analog converter 60 to a voltage corresponding to 14 inches of water pressure. The microprocessor 14 then polls the output of the voltage comparator 58. When the voltage comparator 60 changes operating state, i.e., 14 inches of water pressure has been achieved, the microprocessor 50 starts the timer and sets the output of the digital to analog converter 60 to a voltage corresponding to 13 inches of water pressure. The pressure within the tank decays due to any leaks within the tank and the passage of gas from the tank though the reference orifice 22. When the voltage comparator 58 changes operating state, i.e., 13 inches of water pressure has been achieved, the microprocessor 50 stops the timer. The value shown on the timer, time interval Tdrt (Time for decay for reference and tank), is equal to the time required for the pressure within the tank under test, with the reference orifice 22 open, to decay from 14 inches of water pressure to 13 inches of water pressure. This time value is saved in the RAM memory as T1. Solenoid valve 16 is then closed and the fuel tank is repressurized with nitrogen to a pressure of 14.5 inches of water by the aforementioned "pump-up" pressurization procedure for time interval Trp2 (Time to recover pressure 2). Here again, because of adiabatic heating due to pressurization and changes in gasoline vapor pressure, the pressure within the tank is allowed to stabilize at 14.5 inches of water pressure during time interval Trs2 (Time to recover stability 2). After pressure stabilization has been achieved, the microprocessor 50 sets the output of the digital to analog converter 60 to a voltage corresponding to 14 inches of water pressure. The microprocessor 50 then polls the output of the voltage comparator 58. When the comparator 58 changes operating state, i.e., 14 inches of water pressure has been achieved, the microprocessor 50 starts the timer and sets the output of the digital to analog converter 60 to a voltage corresponding to 13 inches of water pressure. The microprocessor 50 then polls the output of the voltage comparator 58. When the comparator 58 changes operating state, i.e., 13 inches of water pressure has been achieved, the microprocessor 50 stops the timer. The value shown on the timer, time interval Tdt (Time to decay tank), is equal to the time required for the pressure within the tank under test, with the reference orifice 22 closed, to decay from 14 inches of water pressure to 13 inches of water pressure. This time value is stored in the RAM memory as T2. Time T2 is then divided by time T1 and the resulting ratio is compared to a calculated ratio that was derived from the two ratios that were stored in EEPROM 84 during factory calibration of the system. Calculating the ratio from two ratios previously stored in EEPROM 84 increases the accuracy of the test result for different tank head space volumes. If the ratio determined during tank testing is greater than or equal to the ratio stored in EEPROM 84, the microprocessor 50 causes a green LED in LED display 78 to be illuminated indicating that the tank successfully passed the leak test and the system is ready to start a new tank test. If the ratio determined during the tank test is less than the ratio stored in EEPROM 84, the microprocessor 50 causes a red LED in LED display 78 to be illuminated indicating that the tank failed the test and the system is ready to start a new tank test.

It should be noted that in all of the foregoing tests the time for pressure to decay between predetermined pressure levels was measured to determine whether the rate of fuel vapor leakage through the fuel tank was acceptable. It is understood that the same testing approach could be utilized wherein pressure decay could be measured for predetermined time periods, rather than between predetermined pressure levels, to produce similar results, i.e., to determine the acceptability of the fuel vapor leakage rate through the fuel tank.

Certain improvements and modifications will occur to those skilled in the art upon reading the foregoing. It should be understood that all such modifications and improvements have been deleted herein for the sake of conciseness and readability, but are properly within the scope of the following claims.

What is claimed is:

1. A fuel tank tester utilizing an external source of pressure for testing purposes comprising means for connecting the external source of pressure to said fuel tank tester, means for connecting said fuel tank tester to the fuel tank being tested, means for determining the pressure within the fuel tank being tested, a reference orifice contained within said fuel tank tester, means for directing gas from the fuel tank to said reference orifice, means for determining the time required for the pressure within the fuel tank to decay, between predetermined pressure levels, through any leaks which might exist in the fuel tank and the time required for the pressure within the fuel tank to decay, between predetermined pressure levels, through the combination of any leaks which might exist in the fuel tank and said reference orifice when said means for directing gas from the fuel tank to said reference orifice is actuated, and means for comparing said times determined by said time determining means with predetermined ratiometric time relationships for said pressure decays to occur in order to determine whether the fuel tank has an acceptable leakage rate.

2. The tester as defined in claim 1 wherein said pressure determining means is fluidically connected to the fuel tank.

3. The tester as defined in claim 1 further including a microprocessor to control said means for directing gas from the fuel tank to said reference orifice.

4. The tester as defined in claim 3 further including means for comparing a pressure value determined by said pressure determining means with a predetermined pressure value and means for producing an output signal in response to said comparison.

5. A method for testing a fuel tank utilizing a fuel tank tester connected to the fuel tank to be tested and having a reference orifice contained therein, said method comprising the steps of:

a) Pressurizing the fuel tank by utilizing an external source of pressure;

b) Allowing pressure within the fuel tank to stabilize at a predetermined first pressure;

c) Actuating a timer when said pressure within the fuel tank has stabilized at said predetermined first pressure;

d) Allowing gas from the fuel tank to pass through the combination of any leaks which might exist in the fuel tank and a said reference orifice contained in said fuel tank tester until a predetermined second pressure has been reached;

e) Storing the elapsed time on the tinier and stopping gas flow through said reference orifice;

f) Repressurizing the fuel tank by utilizing the external source of pressure;

g) Allowing gas within the fuel tank to stabilize at said predetermined first pressure;

h) Actuating said timer when said pressure within the fuel tank has stabilized at said predetermined first pressure;

i) Allowing gas from the fuel tank to decay through any leaks which might exist in the fuel tank until said predetermined second pressure has been reached;

j) Storing the elapsed time on the timer; and k) Comparing the ratio of the stored time in step e) with the stored time in step j) against a predetermined standard ratio to determine whether the fuel tank has an acceptable leakage rate.

* * * * *